United States Patent
White et al.

(10) Patent No.: US 6,192,444 B1
(45) Date of Patent: *Feb. 20, 2001

(54) METHOD AND SYSTEM FOR PROVIDING ADDITIONAL ADDRESSABLE FUNCTIONAL SPACE ON A DISK FOR USE WITH A VIRTUAL DATA STORAGE SUBSYSTEM

(75) Inventors: Michael Wayne White, LaFayette; Patrick James Tomsula, Arvada; David Serls, Littleton, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,686

(22) Filed: Jan. 5, 1998

(51) Int. Cl.[7] .................................................. G06F 12/00
(52) U.S. Cl. ........................... 711/4; 711/2; 711/203
(58) Field of Search ............................ 711/2, 4, 12, 203

(56) References Cited

U.S. PATENT DOCUMENTS

| | | | | |
|---|---|---|---|---|
| 4,631,673 | * | 12/1986 | Haas et al. | 707/100 |
| 4,758,944 | * | 7/1988 | Bartley et al. | 711/171 |
| 5,175,849 | * | 12/1992 | Schneider | 707/202 |
| 5,247,638 | * | 9/1993 | O'Brien et al. | 710/68 |
| 5,403,639 | * | 4/1995 | Belsan et al. | 707/204 |
| 5,410,667 | * | 4/1995 | Belsan et al. | 711/114 |
| 5,551,003 | * | 8/1996 | Mattson et al. | 711/136 |
| 5,613,113 | * | 3/1997 | Goldring | 707/202 |
| 5,778,411 | * | 7/1998 | DeMoss et al. | 711/4 |
| 5,881,311 | * | 3/1999 | Woods | 710/4 |

* cited by examiner

*Primary Examiner*—John W. Cabeca
*Assistant Examiner*—Fred F. Tzeng
(74) *Attorney, Agent, or Firm*—Sawyer Law Group LLP; Esther E. Klein

(57) ABSTRACT

A method and system in accordance with the present invention provides additional addressable space on a disk for use by a host processor using a virtual data storage subsystem. The method and system includes defining at least one of a plurality of extended image devices on a disk and requesting an instant image to be addressed to an extended image device utilizing channel command words by a host processor. The method and system also includes reading the instant image utilizing commands, such as channel command words or common descriptor blocks, by the host processor. In a method and system in accordance with the present invention, a plurality of extended image devices are defined as extensions of a primary functional device. Data may be transferred between at least one of the plurality of extended images and the primary functional device, or between at least one of the plurality of extended image devices and another of the plurality of extended image devices. An advantage of a method and system in accordance with the present invention is the availability of additional addressable space which may be used by the host processor for accomplishing the subsystem's functions, such as the copying of track pointers. By extending the amount of addressable space, the host processor is alleviated from having to conduct a search for available space within a primary functional device whenever space on the device becomes scarce.

22 Claims, 5 Drawing Sheets

METHOD AND SYSTEM FOR PROVIDING ADDITIONAL ADDRESSABLE FUNCTIONAL SPACE ON A DISK FOR USE WITH A VIRTUAL DATA STORAGE SUBSYSTEM

FIELD OF THE INVENTION

The present invention relates generally to data storage subsystems in computer systems, and more particularly to providing additional addressable functional space on a disk for use by a host processor using a virtual data storage subsystem.

BACKGROUND

Many in the field who use virtual data storage subsystems use it for the copying of logical files or volumes. Virtual refers to a functional unit that appears to be real to a host processor but where the functions are accomplished by other means. Virtual storage involves storage space that may be regarded as addressable main storage by the host processor in which virtual addresses are mapped into real addresses. The amount of virtual addresses are finite, and a host processor must first search for virtual addresses which have been flagged as available whenever it wishes to store data.

A virtual subsystem can be implemented using a Direct Access Storage Device (DASD) subsystem. The DASD subsystem allows the user to define a maximum number of a plurality (typically 256) of virtual functional devices. Each device is defined with a certain finite size, i.e., a certain number of addressable tracks. A track is a unit of space on a disk at which data can be stored. A logical file or volume is stored in a plurality of tracks. The user, either through the host processor or the DASD control panel, defines the devices on a disk to be used by the subsystem. Copies of tracks are often made to the devices for migration to permanent backup media either in parallel or at a later time. Under an existing process commonly referred to as "SnapShot", data may only be copied either within a device or from one device to another within the subsystem. SnapShot's underlying structure is disclosed in Belsan et al., U.S. Pat. No. 5,410,667, filed Apr. 17, 1992, and is fully incorporated by reference herein. Thus, the amount of addressable space on the disk available for an execution of a copying task is limited by the size, i.e., the number of tracks, of a device. This limits the subsystem's ability to copy data.

There is a need to provide additional addressable functional space on a disk for use by the host processor using a virtual data storage subsystem. The additional addressable functional space will alleviate the host processor from having to conduct a search for available space within any device whenever space on the devices become scarce. This method and system should be cost effective, easy to implement, easily adaptable, and host processor independent. The present invention addresses this need.

SUMMARY OF THE INVENTION

A method and system in accordance with the present invention provides additional addressable space on a disk for use by a host processor with a virtual data storage subsystem. The method and system includes defining at least one of a plurality of extended image devices on a disk and requesting an instant image to be addressed to an extended image device utilizing channel command words by a host processor. The method and system also includes reading the instant image utilizing commands, such as channel command words or command descriptor blocks, by the host processor.

In a method and system in accordance with the present invention, a plurality of extended image devices are defined as extensions of primary functional device. Data may be transferred between at least one of the plurality of extended images and the primary functional device, or between at least one of the plurality of extended image devices and another of the plurality of extended image devices. An advantage of a method and system in accordance with the present invention is the availability of additional addressable space which may be used by the host processor for accomplishing the subsystem's functions, such as the copying of track pointers. By extending the amount of addressable space, the host processor is alleviated from having to conduct a search for available space within any primary functional device whenever space on the devices become scarce.

DESCRIPTION OF THE INVENTION

The present invention relates to a method and system for providing additional addressable space on a disk for use by a host processor using a virtual data storage subsystem. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
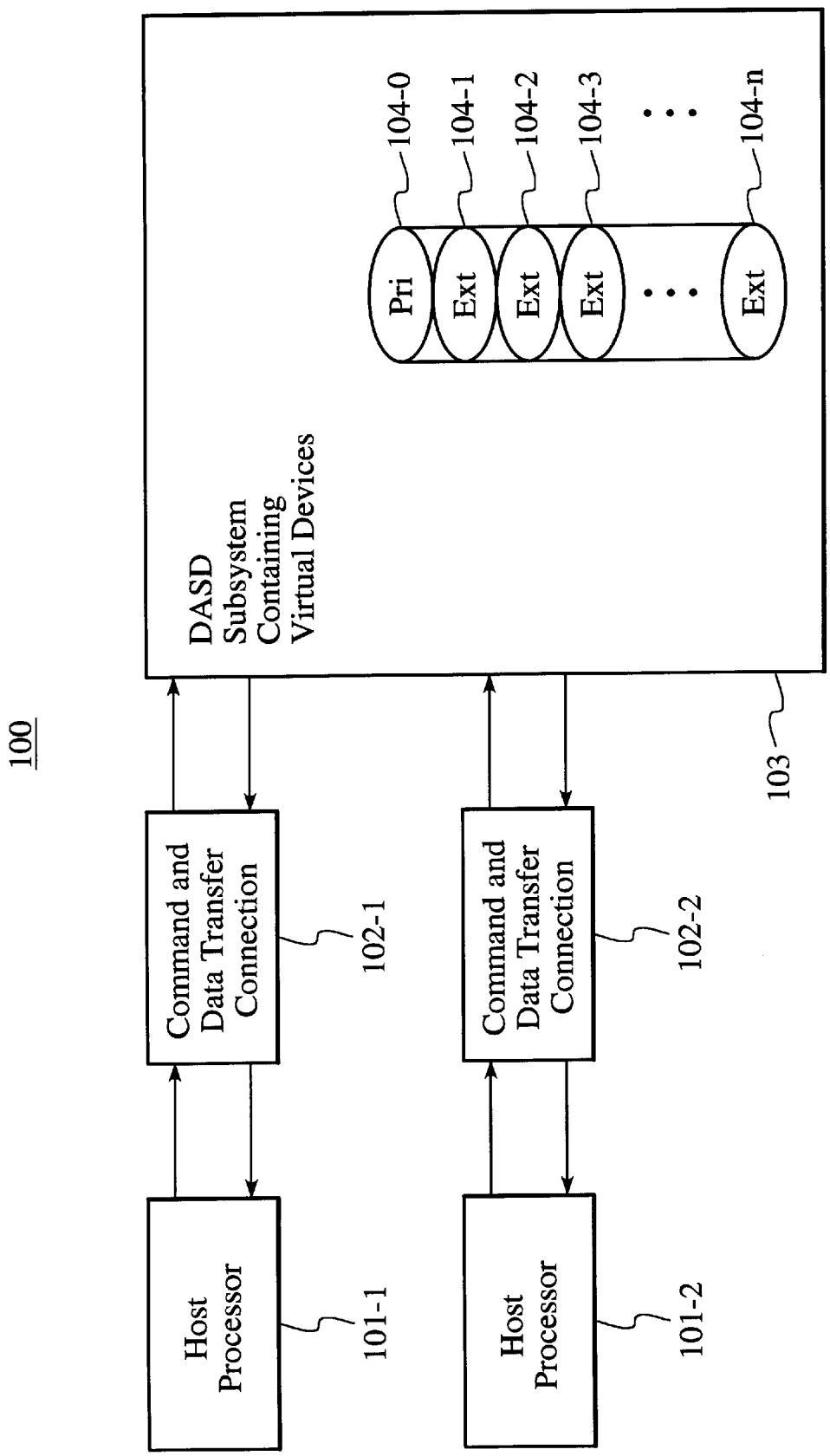
FIG. 1 shows a block diagram of a virtual data storage subsystem which utilizes a system and method in accordance with the present invention.

Many in the field who use virtual data storage subsystems use a DASD subsystem. One such type of subsystem is the IBM RAMAC Virtual Array Storage Subsystem. FIG. 1 illustrates a system 100 which uses the present invention. A host processor 101-1 communicates with the DASD subsystem 103 through the command and data transfer connection 102-1. Within the subsystem 103 are primary functional devices 104-0 which contain addressable functional space for use by the host processor 101-1 for accomplishing the subsystem's various functions. The present invention allows the user to define one or more virtual devices 104-1 to 104-n for use as extensions of the primary device 104-0, thus providing additional addressable space for use by the host processor 101-1. The system 100 is host processor independent.

One of the functions of a subsystem is to copy tracks containing logical files or volumes. One method utilized for this copying is referred to as "SnapShot." Although the present invention will be described in the context of SnapShot, a person of ordinary skill in the art will understand that modifications can be made to apply to other virtual data storage subsystems which copies tracks without departing from the spirit and scope of the present invention.

SnapShot is an instant copy system which uses a large plurality of small form factor disk drives to implement inexpensive, high performance, high reliability disk drive memory to emulate the format and capability of large form factor disk drives. It does so by creating a duplicate track pointer in a virtual track directory to reference a data record that a host processor has requested the data storage subsystem to copy. The creation of this duplicate track pointer is called a "snap." This enables the host processor to access the tracks via two virtual addresses while only a single physical copy of the tracks resides in the data storage system. Because SnapShot copies pointers, the deletion of one pointer will not affect other pointers which point to the same tracks. So the deletion of one copy will not affect duplicates of the tracks. The original tracks are called the source, while the new tracks pointed to by the duplicate track pointer is called the target. Because SnapShot copies pointers rather than the tracks themselves, the speed and efficiency of the data copying process is increased.

One of the primary uses for SnapShot is to make a temporary snap of a track for migration to permanent backup media either in parallel or at a later time. In this case, the snap is intended to be read-only, for the sole purpose of making a checkpoint copy of the data before it is modified.

The DASD subsystem allows the user to define a maximum number of virtual functional devices, typically 256. Currently SnapShot is limited to snaps within a functional device or from one functional device to another functional device. In other words, the amount of functional space available for snaps is limited to the number of tracks in one functional device. When performing a snap, the host processor will search the tracks in a functional device for addressable tracks which has been flagged as available. If there are tracks available, then the snap is performed to it. Therefore, the finite amount of addressable functional tracks in a device limits the subsystem's opportunities for using the device as a SnapShot target. There exists a need for users to be able to extend the amount of addressable tracks for use as targets, thus creating more opportunities for creating duplicate tracks.

The above described problem is solved and a technological advance achieved in the field by allowing users to define additional virtual functional devices for use by a system which copies duplicate tracks. These volumes are established as extensions of an already defined primary functional device. In a preferred embodiment, more than one functional device may be defined as extending the same primary functional device. The user may define as many of the total number of functional devices as possible as extended devices for use. In accordance with the present invention, snaps may be made between an extended and a primary functional device or between one extended device and another extended device. Accordingly, more addressable tracks can be used as targets within the subsystem.

Figure 2:
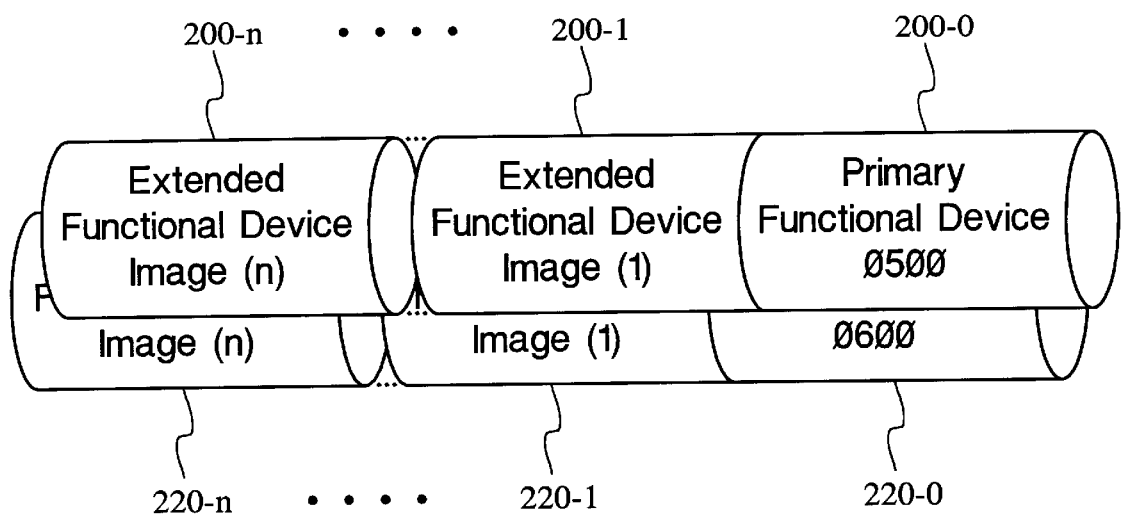
FIG. 2 shows the structure of primary functional devices and Extended Images in accordance with the present invention.

The structure of the primary and extended functional devices that can be utilized in a system and method in accordance with the present invention is illustrated in FIG. 2. The user, through a host processor 101-1, 101-2 (FIG. 1) or the DASD subsystem control panel, defines a primary functional device 200-0. With the present invention, the user can now establish other devices as Extended Functional Device Images, or Extended Images 200-1 through 200-n. These Extended Images 200-1 through 200-n contain additional addressable tracks that are configured in multiples of its corresponding primary functional device 200-0, i.e., it has the same number of addressable tracks as the primary functional device. The primary functional device 200-0, together with its Extended Images 200-1 through 200-n, form an ordered set of devices containing addressable tracks for use by the host processor 101-1 (FIG. 1) with the primary functional device 200-0 as the 0th image and its Extended Images 200-1 through 200-n as the 1st through nth images. The user may define up to n Extended Images for each of the other primary functional devices as well, as represented by 220-0 through 220-n.

In the preferred embodiment, each Extended Image is identified with an Image Sequence Number between 1 and n, indicating which device in the ordered set of devices it falls. Thus, any Extended Image may be uniquely identified by the address of its primary functional device plus its Image Sequence Number. For example, Extended Image 200-1 can be uniquely identified by (0500, 1), "0500" being the address of its primary functional device 200-0 and "1" being its Image Sequence Number. By the same concept, Extended Image 200-n can be uniquely identified by (0500, n), "0500" being the address of 200-0 and "n" being its Image Sequence Number.

The Image Sequence Number and the address of the tracks on the primary functional device may then be used to uniquely identify a particular track on an Extended Image. If the 50th track on an Extended Image is desired, its address can be represented by the 50th track on the primary functional device with the Image Sequence Number of the Extended Image. For example, if the 50th track of the Extended Image 200-1 is desired, it can be identified by (0500, 49, 1), with "0500" being the address of the primary function device 200-0, "49" indicating the 50th track on the primary functional device 200-0, and "1" being the Image Sequence Number of the Extended Image on which the track is located. Since Extended Images are multiples of their primary functional devices, all of the tracks in an Extended Image may be uniquely identified in this manner.

Although the Image Sequence Number is described in accordance with the preferred embodiment, a person of ordinary skill in the art will understand that other means may be used to uniquely identify an Extended Image and tracks on the Extended Image without departing from the spirit and scope of the present invention.

Under the present invention, as will be discussed in more detail hereinafter, the extended tracks are addressable via a new parameter setting in a command of the communications language between a host processor and the virtual data storage subsystem. In the preferred embodiment, where the subsystem is the DASD Subsystem, the standard communications language between the host processor 101-1 and the subsystem 103 is the Channel Command Words (CCW). Included in the CCWs are "ECAM" (Extended Command and Monitoring) Requests. Under this embodiment of the present invention, the new parameter setting is added to the Define Extent Channel Command Word as a new parameter field. This field, along with the proper ECAM request, will enable tracks within an Extended Image to be addressed. Although the new parameter setting will be described in the context of Channel Command Words, a person of ordinary skill in the art will understand that similar modifications can be made to commands of other communications languages, such as the Command Descriptor Blocks of SCSI systems, without departing from the spirit and scope of the present invention.

Figure 3:
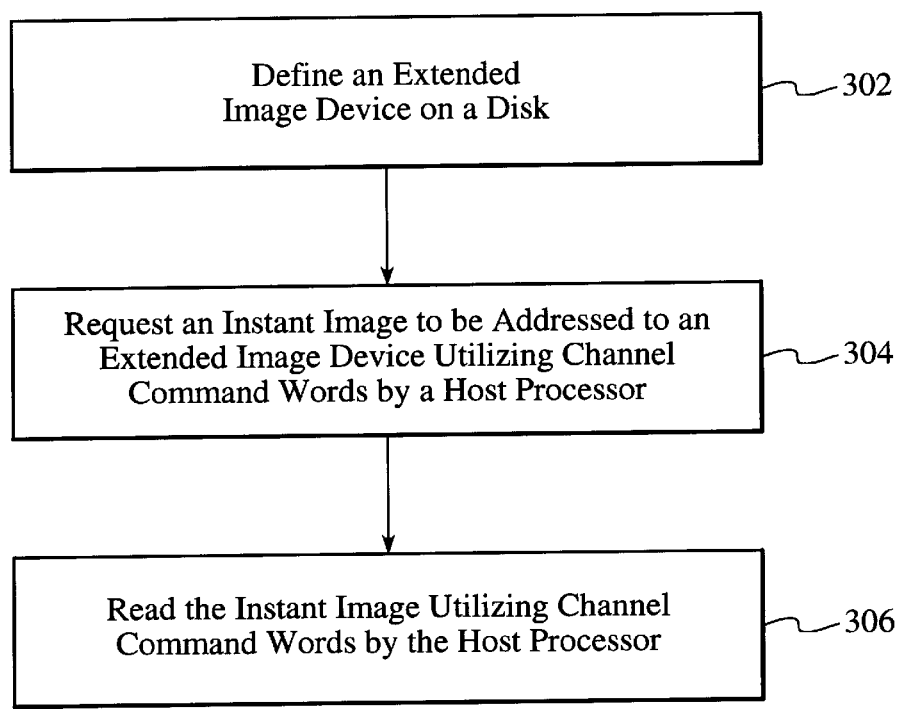
FIG. 3 is a simple flow chart of the system and method for providing additional addressable functional space on a disk utilized by the host processor with a virtual data storage subsystem in accordance with the present invention.

To more particularly describe the features of the present invention, refer now to the following discussion in conjunction with the accompanying figures. FIG. 3 is a simple flow chart for providing additional addressable functional space on a disk that is utilized by a host processor with a virtual data storage subsystem in accordance with the present invention. In a method and system in accordance with the present invention, first an Extended Image device on a disk is provided, via step 302. Next, a track pointer to be written onto an Extended Image device, called an Instant Image, is requested or copied utilizing channel command words by a host processor, via step 304. Finally, the Instant Image is read utilizing channel command words by the host processor, via step 306.

Figure 4:
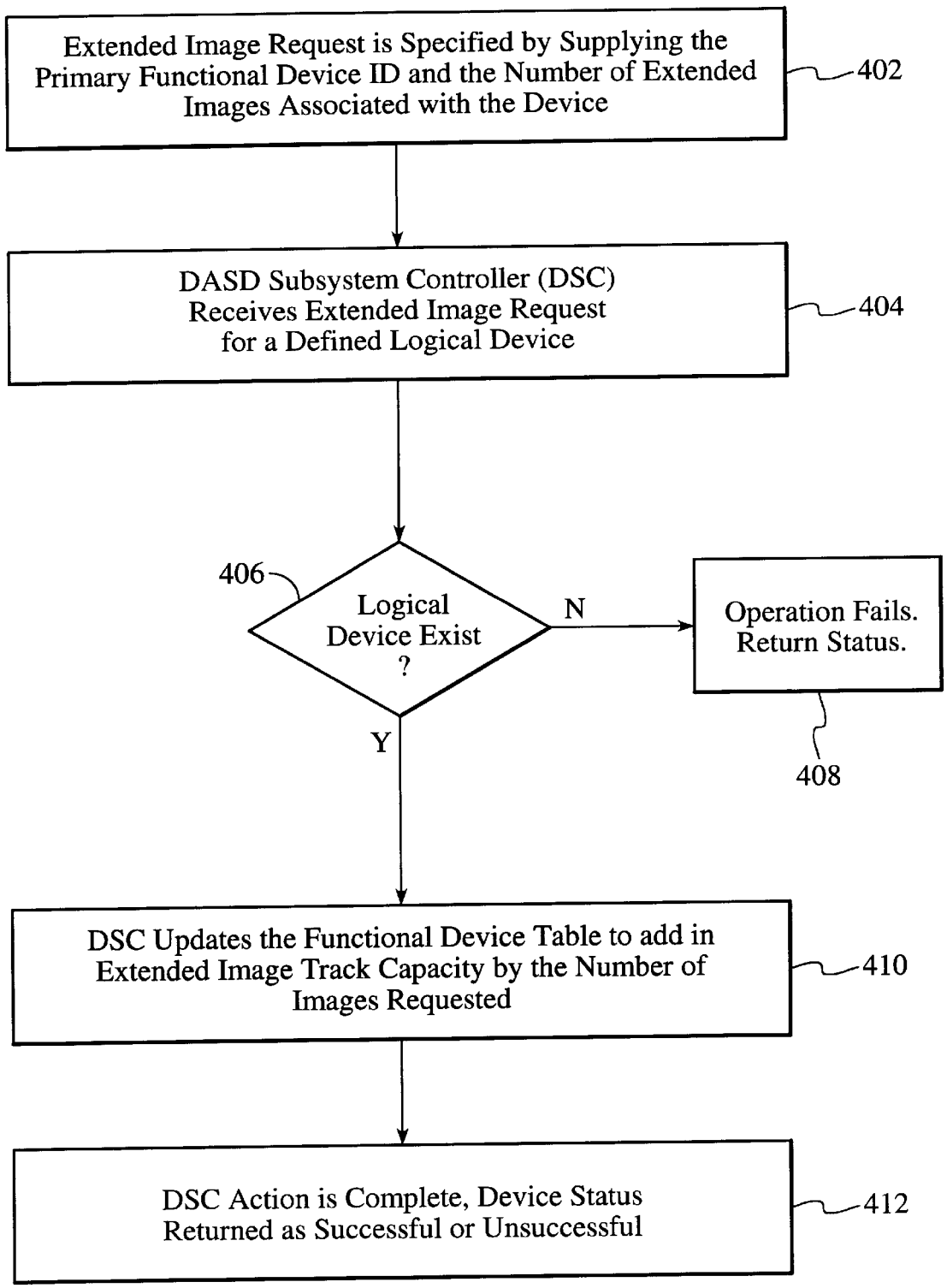
FIG. 4 is a flow chart for defining an Extended Image in accordance with FIG. 3.
Figure 5:
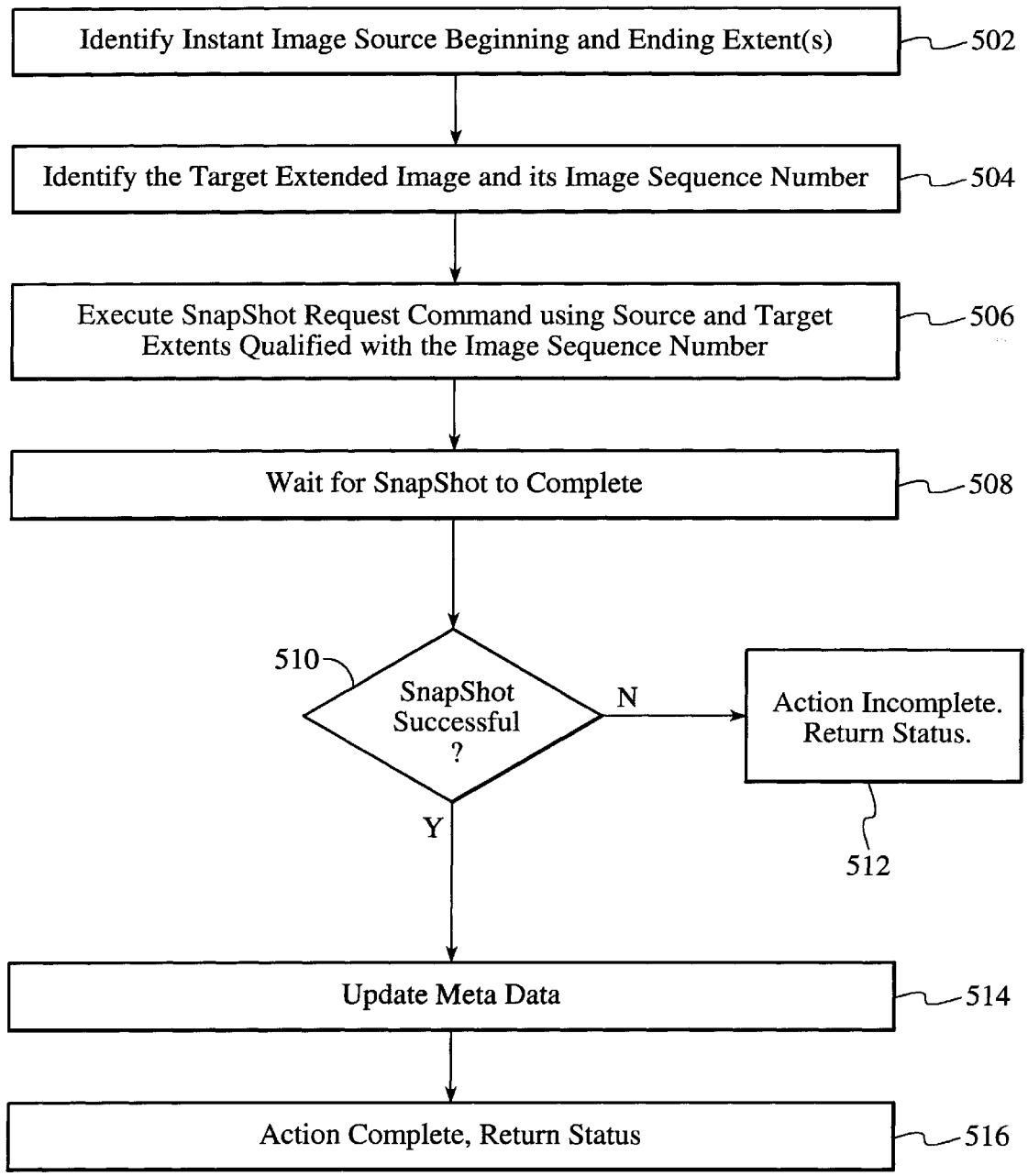
FIG. 5 is a flow chart for requesting an Instant Image in accordance with FIG. 3.
Figure 6:
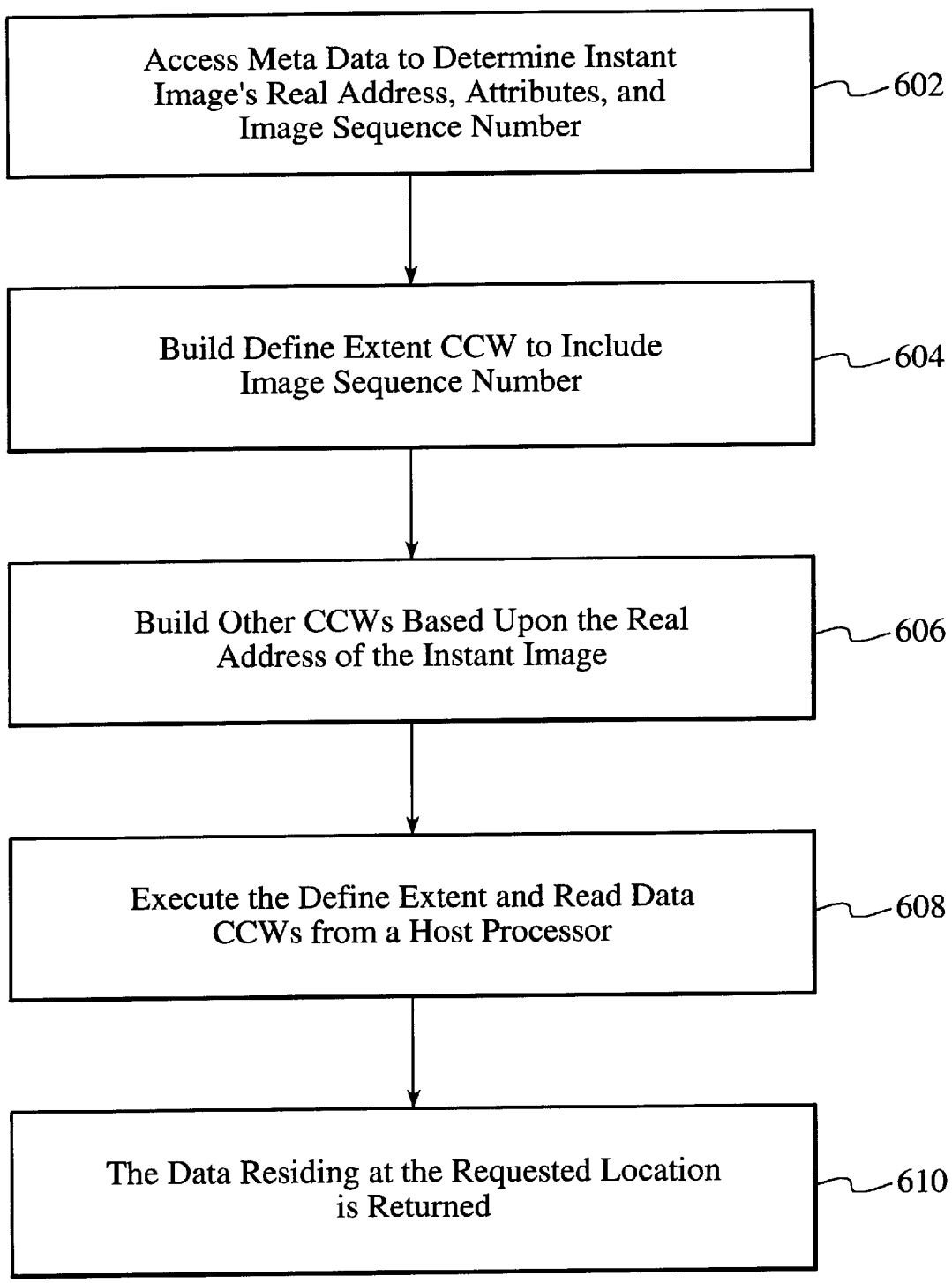
FIG. 6 is a flow chart for reading an Instant Image in accordance with FIG. 3.

To more particularly describe the various features illustrated in FIG. 3, refer now to FIGS. 4–6. FIG. 4 is a flow chart for defining an Extended Image (step 302 of FIG. 3). FIG. 5 is a flow chart for requesting an Instant Image (step 304 of FIG. 3). FIG. 6 is a flow chart for reading an Instant Image (step 306 of FIG. 3).

Referring first to FIG. 4, when defining an Extended Image, first the request for the definition of an Extended Image originates preferably from the host processor or the DASD Subsystem control panel, via step 402. Preferably, an Extended Image request is specified by the user, with the user supplying the primary functional device ID and the number of Extended Images to be associated with this device. Next, the controller of the virtual data storage subsystem, i.e., DASD Subsystem Controller, receives the Extended Image request for a defined logical device, via step 404. The controller then determines if the logical device exists, via step 406. If the logical device does not exist, then the operation fails, via step 408. If the device does exist, the controller updates a functional device table associated with the plurality of devices in the controller, via step 410. The functional device table is preferably internal to the DASD Subsystem Controller. It stores the device's characteristics, including a list of addressable tracks associated with the device. Once the controller completely updates the functional device table, an Extended Image is defined. The controller then returns a device definition status as successful or unsuccessful, via step 412.

Referring back to FIG. 2, the resulting structure from this definition is a primary functional device 200-0 with an array of n numbers of Extended Images, 200-1 through 200-n, associated with it. Each Extended Image of the primary device represents a multiple of the primary device size, i.e., it has the same number of tracks as the primary functional device.

Once an Extended Image is defined, its space may be used for copying pointers. In addition to the ability to use this operation to copy within a primary functional device or from one primary functional device to another primary functional device (i.e., performing the SnapShot operation), copies may now also occur between a primary functional device and an Extended Image or between an Extended Image and another Extended Image.

After the Extended Image is defined, then an Instant Image may be requested to the addressable tracks in the Extended Image. Referring now to FIG. 5, first the virtual data storage subsystem identifies the beginning and ending extents of the source of the Instant Image, via step 502. Next, it identifies the extents of the target, via step 504. In the preferred embodiment, the extents of the target would be the track addresses in a primary functional device plus the target Extended Image's Image Sequence Number.

In conventional systems, the Define Extent CCW already is capable of passing the track addresses on a primary functional device for use in a pointer copy or snap. However, the address of tracks on the Extended Image is what must be passed to request an Instant Image to it. Thus, merely passing the address of tracks on a primary functional device would be insufficient to reach the addressable tracks in an Extended Image. Therefore, in the preferred embodiment in accordance with the present invention, a new parameter setting in the Define Extent CCW is created through the addition of a parameter field where the Image Sequence Number is also passed.

The actual track addresses to which the Instant Image will be requested can be uniquely identified from the address of the corresponding tracks in the primary functional device and the Image Sequence Number, as described above. A person of ordinary skill in the art will understand that instead of passing the Image Sequence Number through the new parameter field along with the corresponding track address in the primary functional device, that other means of identifying the tracks on an Extended Image through the Define Extent CCW could be used without departing from the spirit and scope of the present invention. For example, the actual address of the tracks to which the Instant Image will be requested can be passed instead.

Returning to FIG. 5, the copy or snap operation then executes its request command using the target extents, qualified with the Image Sequence Number, and the source extents, via step 506. The request command, along with the Define Extent CCW, effectuates a snap. The snap is thus performed to the extended addressable tracks within the desired Extended Image. Next it is determined if the snap was successful, via step 510. If the snap is unsuccessful, an error status is returned, via step 512. If the snap was successful, then the system's Meta Data will be updated to include information on the Instant Image, such as its real address, its attributes, and its Image Sequence Number, via step 514. An action complete status is then returned, via step 516. The Meta Data is a host processor-based representation of data on the system, which can serve, for example, similar functions as Volume Table of Contents or File Allocation Tables, where information about each file or volume on the system is stored. Although in the preferred embodiment, the Meta Data must be updated by SnapShot to include information on the Instant Image, a person of ordinary skill in the art will understand that a host processor or file system may be configured such that SnapShot, or a similar copy operation, need not perform this update.

Once the Instant Image has been requested to tracks on an Extended Image, then the Instant Image is read. Referring now to FIG. 6, first the Meta Data is accessed to obtain the Instant Image's real address, its attributes, and its Image Sequence Number, via step 602. Next, the Define Extent CCW for that Instant Image is built to include the Image Sequence Number, via step 604. As explained above, the Image Sequence Number is passed via a new parameter field in the Define Extent CCW so that when the subsystem controller accesses this command, it knows that an Instant Image, and not a primary device's data, is being read. The Instant Image's real address could then be ascertained, allowing tracks outside of the primary functional device to be read. Thereafter, other CCWs of the DASD subsystem are then built based upon the Instant Image's real address, via step 606. Next, the Define Extent and Read Data CCW are executed, causing the data at the Instant Image's real address to be read, via step 608. Finally, the data residing at this address is returned, via step 610.

In the preferred embodiment, an Instant Image remains until overlaid or deleted. It can be overlaid by a subsequent Instant Image request to the same tracks or deleted using, for example, the Deleted Data Space Release ECAM Request which references the Extended Image areas. Through this command, a host processor can be told to free up the designated space for use for other purposes. As when an Instant Image is requested, the host processor is responsible for maintaining knowledge that the Instant Image has been deleted by updating its Meta Data to reflect the availability of the addressable tracks.

The present invention maintains the existing feature of SnapShot that deletion of a pointer does not affect other pointers which point to the same tracks. Thus, when an Instant Image is deleted, it does not effect duplicates of the image which may have been created.

In the preferred embodiment, when an Extended Image is no longer needed it may be discarded by the host processor. For example, if the host processor uses the IBM Extended Facilities Product (IXFP) host software, an Extended Image can be deleted by the IXFP deleting the primary functional device and all Extended Images defined to it, and then redefining the primary functional device without the Extended Image to be deleted. Although the deletion of an Extended Image is described here in the context of the IXFP, a person of ordinary skill in the art will understand that other means can be used to delete an Extended Image without departing from the spirit and scope of the present invention.

Through the method and system of the present invention, as described above in the preferred embodiment, the subsystem is provided with additional addressable functional space on the disk for use by the host processor using a virtual data storage subsystem to copy files or volumes. The present invention gives the subsystem a significantly increased ability over the prior art to perform copying tasks. Such tasks are no longer limited by the amount of addressable space on a primary functional device. The host processor is alleviated from having to conduct a search for available space within a primary functional device whenever space on the device becomes scarce.

Although the present invention has been described in accordance with the embodiment shown, one of ordinary skill in the art will readily recognize that there could be variations to the embodiment and those variations would be within the spirit and scope of the present invention. Accordingly, many modifications may be made by one of ordinary skill in the art without departing from the spirit and scope of the appended claims.

What is claimed is:

1. A method for providing additional addressable space on a disk for use by a host processor using a virtual data storage subsystem comprising the steps of:
   a) primary functional device, wherein the extended image device is identified by an Image Sequence Number, wherein the address of the instant image is passed to the data storage subsystem by passing a corresponding track address on the primary functional device, and by passing the Image Sequence Number through a new parameter setting in a Define Extent Channel Command Word of the data storage subsystem, such that the instant image is located on the extended image device identified by the Image Sequence Number;
   b) requesting an instant image to be addressed to an extended image device utilizing channel command words by the host processor, and
   c) reading the instant image utilizing channel command words by the host processor.

2. The method in claim 1, wherein data may be transferred between the extended image device and the primary functional device.

3. The method in claim 1, wherein data may be transferred between the extended image device and another extended image device.

4. The method in claim 1, wherein an instant image is persistent until overlaid by the data storage subsystem.

5. The method in claim 1, wherein an instant image is persistent until deleted by the data storage subsystem.

6. The method in claim 1, wherein the extended image device may be deleted by the host processor.

7. A method for providing additional addressable space on a disk for use by a host processor using a virtual data storage subsystem comprising the steps of:
   a) defining at least one of a plurality of extended image devices as a multiple of a primary functional device for the purpose of copying tracks, wherein an addressable space on the at least one of the plurality of extended image devices is defined as an extension of an addressable space on the primary functional device, wherein the at least one of the plurality of extended image devices is identified by an Image Sequence Number, wherein the address of the instant image is passed to the data storage subsystem by passing a corresponding track address on the primary functional device, and by passing the Image Sequence Number through a new parameter setting in a Define Extent Channel Command Word of the data storage subsystem, such that the instant image is located on the at least one of the plurality of extended image devices identified by the Image Sequence Number;
   b) requesting an instant image utilizing channel command words of the data storage subsystem which reference the at least one of the plurality of extended image devices as a target for the instant image;
   c) reading an instant image utilizing channel command words of the data storage subsystem which reference the at least one of the plurality of extended image devices on which the instant image resides.

8. The method in claim 7, wherein tracks may be copied between at least one of the plurality of extended image devices and the primary functional device.

9. The method in claim 7, wherein tracks may be copied between at least one of the plurality of extended image devices and another of the plurality of extended image devices.

10. The method in claim 7, wherein an instant image is persistent until overlaid by the data storage system.

11. The method in claim 7, wherein an instant image is persistent until deleted by the data storage subsystem.

12. The method in claim 7, wherein each of the plurality of extended image devices may be deleted by the host processor.

13. A method for providing additional addressable space on a disk for the copying of pointers to tracks by a host processor using a virtual Direct Access Storage Device subsystem comprising the steps of:
   a) defining at least one of a plurality of extended image devices as a multiple of a primary functional device, wherein an addressable space on the at least one of the plurality of extended image devices is defined as an extension of an addressable space on the primary functional device, wherein the extended image device is identified by an Image Sequence Number, wherein the address of the instant image is passed to the data storage subsystem by passing a corresponding track address on the primary functional device, and by passing the Image Sequence Number through a new parameter setting in a Define Extent Channel Command Word of the data storage subsystem, such that the instant image is located on the extended image device identified by the Image Sequence Number;

b) requesting an instant image utilizing a command sequence where an address is passed through the Define Extent Channel Command Word, the address identifying a track on one of the plurality of extended image devices; and c) reading the instant image utilizing a ReadData Channel Command Word and the Define Extent Channel Command Word, the address of the instant image is passed through the Define Extent Channel Command Word, whereby the address allows the ReadData Channel Command Word to read the instant image which resides on a track outside of the primary functional device and within the extended image device.

14. The method in claim 13, wherein pointers to tracks may be copied between at least one of the plurality of extended image devices and the primary functional device.

15. The method in claim 13, wherein pointers to tracks may be copied between at least one of the plurality of extended image devices and another of the plurality of extended image devices.

16. The method in claim 13, wherein an instant image is persistent until overlaid by the data storage subsystem by a subsequent instant image request to the same track.

17. The method in claim 13, wherein an instant image is persistent until deleted using a Deleted Data Space Release ECAM Request which reference the extended image device on which the instant image resides.

18. The method in claim 13, wherein the copying of pointers to track are preformed by SnapShot.

19. The method in claim 13, wherein the command sequence used to request an instant image is a SnapShot request command.

20. The method in claim 13, wherein an instant image is read-only.

21. The method in claim 13, wherein each of the plurality of extended image devices can only be used for the copying of pointers to tracks.

22. A computer readable medium with computer instructions for providing addressable space on a disk for use by a host processor using a virtual data storage subsystem, the computer instructions for:

a) defining an extended image device on a disk, wherein an addressable space on the extended image device is defined as an extension of an addressable space on a primary functional device, wherein the extended image device is identified by an Image Sequence Number, wherein the address of the instant image is passed to the data storage subsystem by passing a corresponding track address on the primary functional device, and by passing the Image Sequence Number through a new parameter setting in a Define Extent Channel Command Word of the data storage subsystem, such that the instant image is located on the extended image device identified by the Image Sequence Number;

b) requesting an instant image to be addressed to an extended image device utilizing channel command words by a host process; and c) reading the instant image utilizing channel command words by the host processor.

* * * * *